United States Patent [19]
Kolar

[11] Patent Number: 6,061,256
[45] Date of Patent: May 9, 2000

[54] APPARATUS FOR CONVERSION OF A THREE-PHASE VOLTAGE INTO AN ISOLATED DC VOLTAGE

[75] Inventor: Johann W. Kolar, Vienna, Austria

[73] Assignee: ABB Patent GmbH, Mannheim, Germany

[21] Appl. No.: 09/371,448

[22] Filed: Aug. 10, 1999

Related U.S. Application Data

[63] Continuation of application No. PCT/EP98/00727, Feb. 10, 1998.

[30] Foreign Application Priority Data

Feb. 10, 1997 [AU] Australia ................................. 207/97

[51] Int. Cl.[7] .................................................. H02M 5/458
[52] U.S. Cl. .................................. 363/37; 363/36; 363/17
[58] Field of Search ................................. 363/17, 34, 36, 363/37

[56] References Cited

U.S. PATENT DOCUMENTS

| | | | |
|---|---|---|---|
| 4,447,695 | 5/1984 | Inoue ........................................ | 363/37 |
| 4,533,987 | 8/1985 | Tomofuji et al. ........................ | 363/36 |
| 4,939,381 | 7/1990 | Shibata et al. .......................... | 363/17 |

*Primary Examiner*—Jeffrey Sterrett
*Attorney, Agent, or Firm*—Herbert L. Lerner; Laurence A. Greenberg; Werner H. Stemer

[57] ABSTRACT

An apparatus for conversion of a three-phase voltage system into an electrically isolated DC voltage to be predetermined freely, and a method for controlling the same, include primary and secondary circuits. Each phase of the primary circuit has a series inductance connected to one input of a bidirectional, bipolar electronic switching apparatus. Second inputs of the switching apparatuses are directly connected. A positive primary voltage rail is fed through diodes, and a negative primary voltage rail is fed through other diodes. One winding end of a primary winding of a transformer is connected to a line connecting the second inputs of the switching apparatuses. A power transistor, which is connected to the positive primary voltage rail on the collector/drain side and has an antiparallel connected diode, is connected to another winding end of the primary winding. A further power transistor, which is connected to the negative primary voltage rail on the emitter/source side and has an antiparallel connected diode, branches off from the other winding end of the primary winding. A secondary winding of the transformer is connected to input terminals of a single-phase diode bridge having a capacitance disposed between output terminals and smoothing the output voltage as a full-wave bridge circuit.

3 Claims, 1 Drawing Sheet

APPARATUS FOR CONVERSION OF A THREE-PHASE VOLTAGE INTO AN ISOLATED DC VOLTAGE

CROSS REFERENCE TO RELATED APPLICATION

This application is a continuation of copending International application Ser. No. PCT/EP98/00727, filed Feb. 10, 1998, which designated the United States.

BACKGROUND OF THE INVENTION

Field of the Invention

The invention relates to an apparatus for conversion of a three-phase voltage system into an electrically isolated DC voltage to be predetermined freely, including a primary circuit and a secondary circuit, each phase of the primary circuit having a series inductance connected to one input of an associated bidirectional, bipolar electronic switching apparatus having directly connected respective second inputs, a positive primary voltage rail fed through diodes, and a negative primary voltage rail fed through other diodes. The invention also relates to a method for controlling the apparatus.

According to the present prior art, a converter circuit and a control device known from European Patent Application EP 0 660 498 and having a downstream DC-voltage converter stage, is preferably used to provide a three-phase pulsed rectifier system to meet a requirement for current taken from a three-phase mains system to have an approximately sinusoidal profile, for the mains system response at the fundamental frequency to be resistive, and to provide potential isolation and the capability of controlling the output DC voltage.

However, voltage intermediate-circuit converter systems which are formed in that way have a power section with a relatively complex structure and relatively low efficiency, since the energy conversion takes place in two stages, and the overall efficiency is thus governed by the product of the efficiency elements.

Furthermore, the capacitors which have to be provided to buffer the intermediate-circuit voltage increase the physical size of the system, and reduce its power density.

SUMMARY OF THE INVENTION

It is accordingly an object of the invention to provide a three-phase pulsed rectifier system which allows direct (single-stage) conversion of a three-phase mains voltage into an electrically isolated DC voltage, in which a further fundamental requirement is that the mains current have a sinusoidal profile and that an output voltage can be controlled, as well as a method for controlling the system, which overcome the hereinafore-mentioned disadvantages of the heretofore-known systems and methods of this general type.

With the foregoing and other objects in view there is provided, in accordance with the invention, an apparatus for conversion of a three-phase voltage system into an electrically isolated DC voltage to be predetermined freely, the apparatus comprising a primary circuit having phases, a positive primary voltage rail and a negative primary voltage rail; each of the phases of the primary circuit having an associated bidirectional, bipolar electronic switching apparatus with first and second inputs, a series inductance connected to the first input, a first diode feeding the positive primary voltage rail, and a second diode feeding the negative primary voltage rail; a transformer having a primary winding with first and second winding end terminals, and a secondary winding; a line connected between the first winding end terminal and the second inputs of the switching apparatuses; a first power transistor connected to the second winding terminal of the primary winding and having a collector or drain side connected to the positive primary voltage rail, and a diode connected antiparallel to the first power transistor; a second power transistor connected to the second winding terminal of the primary winding and having an emitter or source side connected to the negative primary voltage rail, and a diode connected antiparallel to the second power transistor; and a secondary circuit having a single-phase diode bridge with input terminals connected to the secondary winding of the transformer, and output terminals, and a capacitance connected between the output terminals for smoothing an output voltage as a full-wave bridge circuit.

The rectifier system may be regarded as being formed by the combination according to the invention of functional and component groups of the known basic structures of unidirectional three-phase, three-point pulsed rectifier systems with subsystems according to the invention. The control thereof may be derived from the drive commands for the switching elements of the original converter unit. The output voltage and the mains current of the circuit that finally results can advantageously be controlled in the same way as the original apparatus.

In the simplest case, the power section of a conventional three-phase, three-point pulsed rectifier system is formed by series inductances on the mains side, by a bidirectional, bipolar electronic switching apparatus located in each phase between the series inductance and the neutral point of the output voltage, and by rectifier diodes which are connected from the positive terminals of these switching apparatuses to the positive output voltage rail, and are connected from the negative output voltage rail to the negative terminals of the phase switching apparatuses, with the output voltage elements being supported by capacitors. The basic concept of the invention is then to replace the output capacitors by an electronic switching apparatus and the primary winding of a transformer having a secondary voltage which is rectified and capacitively smoothed through a diode bridge, and to control the switching apparatus in such a manner that the voltage which occurs across the primary winding simulates the voltage originally defined by the capacitors. For this purpose, the primary winding of the transformer is connected at one end to the common connection of the electronic phase switching apparatuses of the original circuit, and is connected by the second terminal to the output of a half-bridge arm which is located between the positive and negative (intermediate-circuit) voltage rails and is formed by a series circuit including a positive transistor with antiparallel or back-to-back connected diodes and a negative transistor with an antiparallel or back-to-back connected diode.

It is assumed for the rest of the analysis that one phase current is physically positive, that is to say flowing into one input terminal of the system, and the currents of the other phases are physically negative (that is to say considering the conditions within a section of the mains system cycle with an electrical width of 60°). Through the use thereof, due to the symmetry of a three-phase mains system, this covers the conditions over the entire mains system cycle, in which case the currents are forced to flow through the series inductances (in conjunction with appropriate current control). Furthermore, it is assumed that the system has an output voltage or secondary voltage such that, when current is flowing through the primary winding, a voltage which is greater than the peak value of the concatenated mains system voltage is injected.

It may be assumed that the phase switching apparatuses are now switched on and a control signal which is emitted by a control apparatus (constructed, for example, as a two point mains system current controller) of the system opens the phase switching apparatus for the phase carrying the positive input current. In that case, the positive transistor of the half-bridge arm is switched on in such a way that it overlaps in time and the phase current is thus carried through the primary winding of the transformer. As a result thereof the voltage which is present across the secondary of the transformer as a result of the current flow on the secondary side into the output capacitance (which current flow occurs due to the magnetization compensation) is injected on the primary side. Since this voltage is greater than the peak value of the concatenated mains system voltage, on the basis of the precondition, the positive phase current (while at the same time supplying energy to the output circuit) is reduced, thus achieving the aim desired by the current regulator. In a completely analogous manner, when the switching device of a phase carrying a negative current is switched off, the negative transistor of the half-bridge arm is switched on overlapping, thus reducing the magnitude of the associated phase current, and supplying energy to the output circuit. (If a phase switching apparatus carrying positive current and a phase switching apparatus carrying negative current are switched off, the positive and negative transistors in the bridge arm are switched on.) When a phase switching apparatus is switched on again, the positive transistor is switched off with the delay if the mathematical sign of the associated phase current is positive, and the negative transistor in the bridge arm is switched off with the delay if the mathematical sign is negative, thus allowing the magnitude of the corresponding phase current to rise again.

In addition to controlling the mains system current, it is necessary to ensure, for optimum utilization of the magnetic circuit of the transformer, that the magnetization is also symmetrical and that current which is forced to flow in the primary winding of the transformer has no direct-current component. This corresponds entirely to the requirement for the current which flows into the capacitively formed neutral point of the output voltage of the original rectifier system to have a mean value which disappears. This can be achieved with the same control strategy, which corresponds to that of the prior art and will thus not be discussed in any more detail, through converter switching states that are redundant with regard to voltage formation.

The rectifier system according to the invention does not have any special features either with respect to control of the output voltage or the control of the mains system phase current, which is subordinate thereto. For example, the two-point control of phase currents which is known for three-phase, three-point pulsed rectifiers may be used in identical form, and all that need be borne in mind in the present case is that only two of the three-phase switching apparatuses are always in the switched-off state. Therefore, the phase current regulators always have a voltage available to them that is required to carry out the control task. The control circuit will therefore not be described in any more detail.

With the objects of the invention in view there is also provided a method for controlling the apparatus with reference to control signals formed by tolerance-band control of mains phase currents being subordinate to control of the output voltage, which comprises switching on the first power transistor before one of the switching apparatuses carrying positive phase current is switched off, initiated by the current control, and switching off the first power transistor again only after the switching apparatus has been switched on again; switching on the second power transistor before one of the switching apparatuses carrying negative phase current is switched off, and switching off the second power transistor again only after the switching apparatus has been switched on again, ensuring that the phase currents forced to flow by the input inductances have a continuous profile; generating a voltage required to control the mains phase currents and opposing the mains voltage, by passing a phase current through the primary winding of the transformer causing a current to flow on the secondary side of the transformer between the first and second winding end terminals; and always maintaining at least one of the phase switching apparatuses switched on, and controlling the output voltage with an amplitude of the mains phase currents.

It should be noted that the circuit function described above cannot be linked to a specific configuration of the secondary part of the system according to the invention. In a manner corresponding to the prior art, which will therefore not be described in any more detail, the secondary winding may be connected both through a full-wave diode bridge circuit to the output smoothing capacitance or may be constructed as a neutral-point circuit. In other words, it has two separate winding sections and only two output diodes. In that case the neutral-point circuit has reduced conduction losses at high current levels, although this is characterized by greater implementation complexity and lower utilization of the transformer.

Therefore, in accordance with a concomitant feature of the invention, the secondary circuit has a neutral point.

Other features which are considered as characteristic for the invention are set forth in the appended claims.

Although the invention is illustrated and described herein as embodied in an apparatus for conversion of a three-phase voltage system and a method for controlling the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
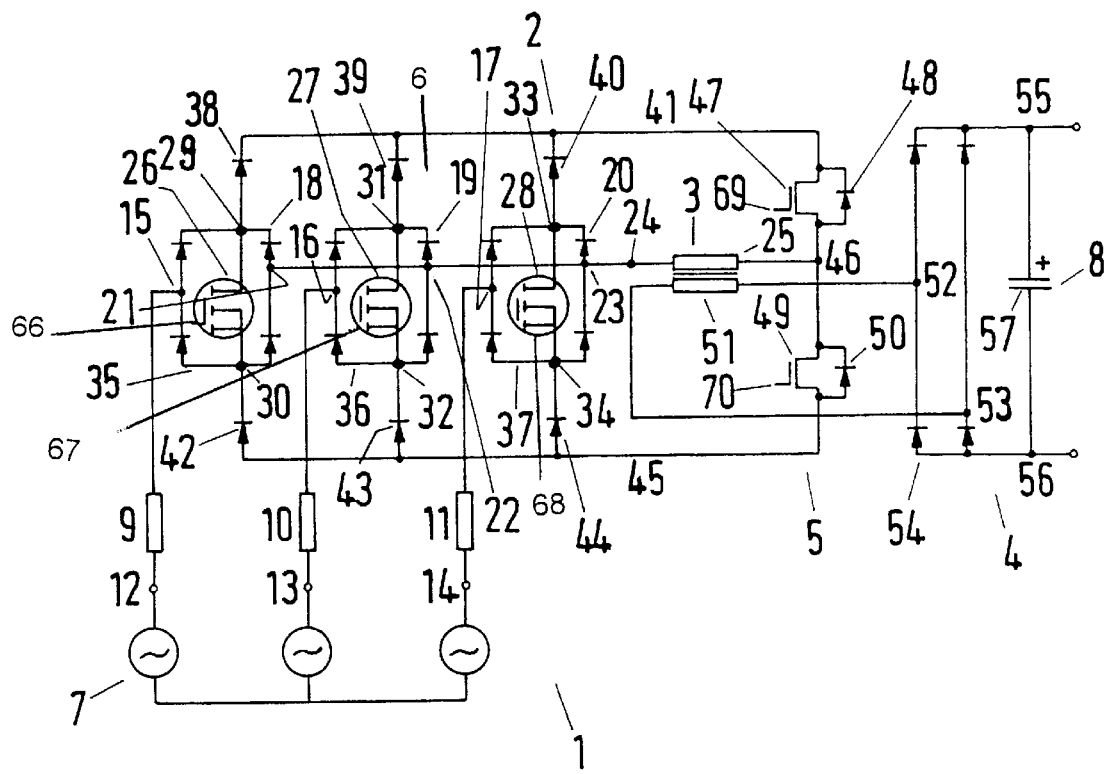
FIG. 1 is a simplified, schematic circuit diagram showing a basic structure of a power section of a rectifier system (with subsystems connected according to the invention or with component groups having a structure according to the invention with functional groups of a known unidirectional three-phase, three-point pulsed rectifier system) having an electrically isolated output voltage.

Referring now to the figures of the drawings in detail and first, particularly, to FIG. 1 thereof, there is seen a three-phase pulsed rectifier system 1 that has a primary circuit 2 and a secondary circuit 4, which is electrically isolated by a transformer 3, and which is formed by a combination according to the invention of a subsystem 5 having a structure according to the invention, with an input section 6 of a three-phase, three-point pulsed rectifier system corresponding to the prior art. The basic function of the rectifier system 1 is unidirectional conversion of a three-phase input voltage system 7 into an electrically isolated output DC voltage 8. Series inductances 9, 10, 11 are connected in a known manner from input voltage terminals 12, 13, 14 to first inputs 15, 16, 17 of bidirectional, bipolar electronic switching apparatuses 18, 19, 20 having respective second inputs 21, 22, 23 that are connected to a first terminal 24 of a primary winding 25 of the transformer 3. The input section 6 is formed by the switching apparatuses 18, 19, 20. The electronic switching apparatus 18, 19, 20 in each phase is formed, for example, by placing a respective unidirectional, unipolar switch 26 or 27 or 28 across respective terminals 29, 30 or 31, 32 or 33, 34 on the DC voltage side of respective single-phase diode bridge circuits 35 or 36 or 37. These diode bridges have terminals on the AC voltage side which correspond to the above-mentioned inputs of the electronic switching apparatuses 18, 19, 20. Furthermore, in the simplest case, the positive terminals 29, 31, 32 of the diode bridges 35, 36, 37 are connected through diodes 38, 39, 40 to a positive primary voltage rail 41, and the negative terminals 30, 32, 34 are connected through diodes 42, 43, 44 to a negative primary voltage rail 45.

The subsystem 5 according to the invention includes a first power transistor (or, in general, an electronic switch) 47 on the primary side. The power transistor 47 is connected to the positive primary voltage rail 41 on a collector side or drain side and is connected to a second terminal 46 of the primary winding 25 on an emitter side or source side. The subsystem 5 also includes a diode 48 connected antiparallel or back-to-back with the power transistor 47, as well as a second power transistor (or, in general, electronic switch) 49. The power transistor 49 is connected to the negative primary voltage rail 45 on an emitter side or source side and is connected to the terminal 46 of the primary winding 25 on a collector side or drain side. The subsystem 5 additionally includes a diode 50 connected back-to back with the power transistor 49. A secondary winding 51 of the transformer 3 is connected, for example, to input terminals 52 and 53 of a single-phase diode bridge 54 having a capacitance 57 which is disposed between output terminals 55 and 56 and smoothes the output voltage 8, that is to say as a full-wave bridge circuit.

Figure 2:
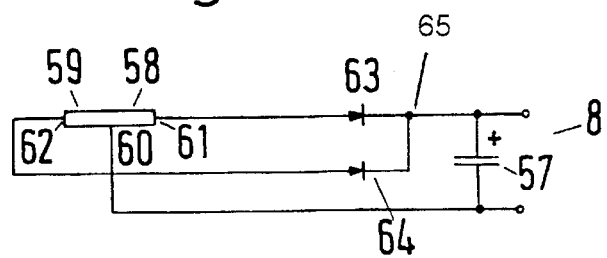
FIG. 2 is a diagram showing a structural variant of a secondary circuit of the apparatus according to the invention.

FIG. 2 shows an advantageous structural variant of the secondary circuit of the apparatus according to the invention. In this case, the secondary winding 51 of the transformer 3 is provided by two winding sections 58 and 59 which are connected at one end. A connecting terminal 60 of the winding elements forms one pole of the output voltage 8. Diodes 63 and 64 are connected from respective other winding ends 61 and 62 on the cathode side or anode side to a further circuit point 65, which forms another pole of the output voltage. The smoothing capacitance 57 is disposed between the circuit point 65 and the connecting terminal 60 and provides a neutral-point circuit having lower conduction losses than a full-wave bridge circuit.

The switching state of the apparatus is defined by signals which are applied from an output voltage control device, or by an input current control device subordinate thereto, (for example constructed as a two-point or tolerance-band regulator) to control inputs 66, 67, 68 of the electronic switching apparatuses 18, 19, 20 in the phases. The control inputs 66, 67, 68 are inputs of the unidirectional, unipolar switches 26, 27, 28. The circuit part 5 according to the invention as controlled by control signals which are derived from the control commands at the control inputs 66, 67, 68 and are applied to base connections or gate connections 69 and 70 of the power transistors 47 and 49.

The rest of the explanation of the circuit function is based on the assumption of mains system phase current which physically flows into the input terminal 12 of the switching apparatus and is thus positive, as well as a physically negative value of the mains system current for the two other phases. This covers the conditions throughout an entire mains system cycle since, if the mains system currents have a sinusoidal profile (with the exception of the zero crossings), two phase currents always have the same mathematical sign, and the third phase current always has the opposite mathematical sign.

If, for example, the phase switching apparatuses 18, 19, 20 are now all switched on together, and the rising mains system phase current flowing through the input terminal 12 leaves the tolerance band, the power transistor 47 is switched on by a control command 69 derived from the output of the current control device that is associated with that phase (which advantageously ensures that the mains system current has a sinusoidal profile in phase with the associated phase voltage), and the switching apparatus 18 is opened with a short time delay. As a result thereof, the phase current permeates into the freewheeling diode 38 and is closed through the primary winding 25 of the transformer 3 and the phase switching apparatuses 19 and 20. The current flow in the primary winding 25 leads to a corresponding current flow, which compensates for magnetization, occurring in the secondary winding 51 of the transformer 3, which is fed through the diode bridge 54 into the output voltage 8 and the output capacitor 57. As a result thereof, power is supplied to the output circuit, and a voltage (which is physically directed from the input terminal 52 to the input terminal 53 and is transformed into a primary voltage directed from the terminal 46 to the terminal 24) occurs across the secondary winding. If this primary voltage, which is injected through the transformer, is chosen to be higher than the concatenated mains system voltage (by the transformer having an appropriate transformation ratio), this results in the phase current flowing in through the terminal 12 being reduced. As a result thereof, it finally leaves the tolerance band at the bottom and the switching apparatus 18 is switched on again which, for current control purposes, leads to the phase current rising once again.

Thus, to generalize the procedure described above, the power transistor 47 in a phase carrying positive current is switched on before the switching apparatus is switched off, and is switched off again immediately after the switching apparatus has been switched on again. The power transistor 49 is switched on before a phase carrying negative current is switched off, and is switched off again once this phase has been switched on again, in which case it is permissible in principle for the power transistors 47 and 49 to be switched on simultaneously. However, interlock logic, for example, can be used to ensure that there are never more than two phase switching apparatuses in the switched-off state since, if all of the switching apparatuses were switched off, the terminals 15, 16, 17 would be short-circuited through the diodes 38, 39, 40, the transistors 47 and 48 and the diodes 42, 43, 44 and none of the phase currents would be passed through the primary winding 25. That would result in no opposing voltage being injected into the phase current path, which would result in a rise in the phase currents and not in a reduction in the magnitudes of the phase currents.

Thus, in general, the output voltage is used indirectly to control the mains system current, in which case sections of the mains system phase currents which are transformed on the basis of the turns ratios of the transformer are always fed into the output circuit. Through the use thereof, even without more detailed study of the function of the apparatus according to the invention, the possibility of controlling the output voltage through the amplitude of the mains system currents becomes clear. If the output voltage is stabilized through the use of electrochemical energy storage devices, the mean charging rate is determined by presetting of the mains system current amplitude.

In addition to controlling the mains system current and the output voltage, it is also necessary to ensure, for the system according to the invention, that the magnetic core drive level is as symmetrical as possible. A positive or negative current flow through the primary winding is always associated with the occurrence of a positive or negative primary voltage. Therefore, this can be achieved in the simplest case by the primary current having a profile without any direct current component. That results in an analogy to stabilization of the potential of the capacitively formed neutral point of a conventional three-point pulsed rectifier system. Thus, for example, the secondary current or the secondary voltage of the transformer can be detected, and the occurrence of any transient direct-current component can be corrected. That is preferably done by controlling the mains system current (for example by addition of a mathematical sign corresponding to offsets to the phase current nominal values) by using those switching states of the rectifier system which make the magnetization state of the transformer symmetrical but are redundant in terms of voltage formation on the primary side. Since this method corresponds to the prior art, with the exception of detection of the magnetization state of the transformer, no further description will be given in the course of the present application.

I claim:

1. An apparatus for conversion of a three-phase voltage system into an electrically isolated DC voltage to be predetermined freely, the apparatus comprising:

a primary circuit having phases, a positive primary voltage rail and a negative primary voltage rail;

each of said phases of said primary circuit having an associated bidirectional, bipolar electronic switching apparatus with first and second inputs, a series inductance connected to said first input, a first diode feeding said positive primary voltage rail, and a second diode feeding said negative primary voltage rail;

a transformer having a primary winding with first and second winding end terminals, and a secondary winding;

a line connected between said first winding end terminal and said second inputs of said switching apparatuses;

a first power transistor connected to said second winding terminal of said primary winding and having a collector or drain side connected to said positive primary voltage rail, and a diode connected antiparallel to said first power transistor;

a second power transistor connected to said second winding terminal of said primary winding and having an emitter or source side connected to said negative primary voltage rail, and a diode connected antiparallel to said second power transistor; and a secondary circuit having a single-phase diode bridge with input terminals connected to said secondary winding of said transformer, and output terminals, and a capacitance connected between said output terminals for smoothing an output voltage as a full-wave bridge circuit.

2. The apparatus according to claim 1, wherein said secondary circuit has a neutral point.

3. A method for controlling the apparatus according to claim 1 with reference to control signals formed by tolerance-band control of mains phase currents being subordinate to control of the output voltage, which comprises:

switching on said first power transistor before one of said switching apparatuses carrying positive phase current is switched off, initiated by the current control, and switching off said first power transistor again only after said switching apparatus has been switched on again;

switching on said second power transistor before one of said switching apparatuses carrying negative phase current is switched off, and switching off said second power transistor again only after said switching apparatus has been switched on again, ensuring that the phase currents forced to flow by said input inductances have a continuous profile;

generating a voltage required to control the mains phase currents and opposing the mains voltage, by passing a phase current through said primary winding of said transformer causing a current to flow on said secondary side of said transformer between said first and second winding end terminals; and always maintaining at least one of said phase switching apparatuses switched on, and controlling the output voltage with an amplitude of the mains phase currents.

* * * * *